(No Model.)

O. M. MITCHELL.
BICYCLE BEARING.

No. 296,703. Patented Apr. 8, 1884.

WITNESSES:
C. H. Luther Jr
Fred. E. Field.

INVENTOR:
Oliver M. Mitchell
by Joseph A. Miller & Co
Attys

UNITED STATES PATENT OFFICE.

OLIVER M. MITCHELL, OF PROVIDENCE, RHODE ISLAND.

BICYCLE-BEARING.

SPECIFICATION forming part of Letters Patent No. 296,703, dated April 8, 1884.

Application filed January 17, 1884. (No model.)

*To all whom it may concern:*

Be it known that I, OLIVER M. MITCHELL, of the city and county of Providence, and State of Rhode Island, have invented a new and useful Improvement in Bicycle-Bearings, of which the following is a specification.

My invention relates to cone-bearings for bicycle-wheels; and the object of my invention is to produce a cone-bearing which may be adjusted so as to embrace the spindle more or less tightly, while at the same time retain its rigidity.

My invention consists in a cone-bearing which is provided at each end with an external screw-thread and a nut for each screw-threaded end of said bearing.

Figure 1:
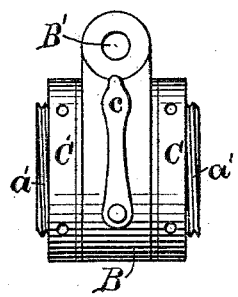
Figure 2:
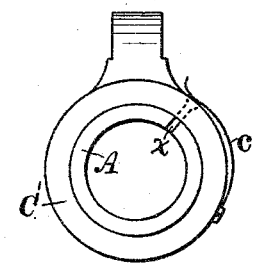
Figure 3:
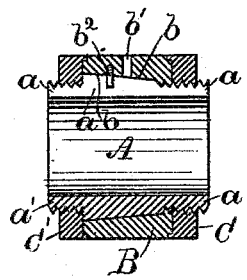
Figure 4:
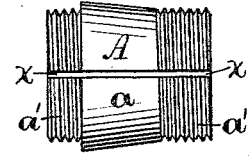

In the accompanying drawings, Figure 1 is a side view of my improved bearing. Fig. 2 is an end view of the same. Fig. 3 is a longitudinal section of the same. Fig. 4 is a detached view in side elevation of the cone-bearing ring.

In the said drawings, A designates the cone-bearing, which is a split ring, as indicated at X, and is of bearing metal. The center of the ring is formed externally with an oblique or conical section, $a$, and at each end with a screw-thread, $a'$.

B designates the bearing-rim, which is formed with a central internal oblique portion $b$, the pitch of which corresponds to that of the oblique portion $a$. The rim B is also formed with a channel, $b'$, for lubricant, extending entirely through the rim. A pin, $b^2$, is also formed on the inner side of the rim B, in longitudinal alignment with the channel $b'$.

$c$ is an arm secured pivotally at one end, and resting at the other end arranged to overlap the channel $b'$, so as to confine the lubricant in the channel $b'$.

B' designates the eye, to which the corresponding end of the fork is attached, and C' C' the nuts by which the ring A is adjusted.

In using this improved bearing the bearing-ring A is slipped into the rim or collar B in such manner that the pin $b^2$ shall enter the slit X in said ring. Thus the lubricant from the channel $b'$ will reach the axle through the slit. If, now, it is desired to have the ring A hug the axle tightly, the nut C is screwed well up on the ring, so as to force its oblique sides $a$ well against the oblique portion $b$ of the rim, whereby the ring A is compressed. The nut C' is now screwed on and is in this instance virtually inoperative. When the bearing is to be loosened, the nut C is unscrewed to a certain extent and the nut C' is correspondingly tightened, whereby the ring A is relieved of a proportionate degree of compression, and yet is held rigidly in its seat.

This form of bearing is a valuable addition to a bicycle, for the reason that it affords a simple and efficient means for taking up wear on the bearing, and also because it meets the demand for a bearing which may be readily adjusted to the requirements of the rider in short and smooth trips, or in long and rough ones.

Having thus described my invention, I claim as new and desire to secure by Letters Patent—

1. The combination, with the rim B, having the oblique portion $b$, of the split bearing-ring A, provided with threaded ends and the oblique portion $a$, and the nuts C C', arranged and operating as set forth.

2. The combination, with the split-ring bearing A, having the oblique portion $a$ and the screw-threads $a'$ $a'$, of the rim B, having the oblique portion $b$, the channel $b'$, the pin $b^2$, and the pivoted arm $c$, and the nuts C C', arranged and operating as set forth.

In witness whereof I have hereunto set my hand.

OLIVER M. MITCHELL.

Witnesses:
J. A. MILLER, Jr.,
M. F. BLIGH.